United States Patent
Tsfaty et al.

(10) Patent No.: US 8,498,678 B2
(45) Date of Patent: Jul. 30, 2013

(54) SYSTEM AND METHOD FOR REDUCING POWER CONSUMPTION IN A WIRELESS DEVICE

(75) Inventors: Yossi Tsfaty, Rishon-Le-Zion (IL); Itay Sherman, Raanana (IL)

(73) Assignee: Texas Instruments Incorporated, Dallas, TX (US)

(*) Notice: Subject to any disclaimer, the term of this patent is extended or adjusted under 35 U.S.C. 154(b) by 1175 days.

(21) Appl. No.: 12/169,762

(22) Filed: Jul. 9, 2008

(65) Prior Publication Data

US 2009/0017879 A1 Jan. 15, 2009

Related U.S. Application Data

(60) Provisional application No. 60/948,830, filed on Jul. 10, 2007.

(51) Int. Cl.
*H04M 1/00* (2006.01)
(52) U.S. Cl.
USPC .......................................... 455/574; 370/278
(58) Field of Classification Search
None
See application file for complete search history.

(56) References Cited

U.S. PATENT DOCUMENTS

| | | | |
|---|---|---|---|
| 5,737,695 A | 4/1998 | Lagerqvist et al. | |
| 6,804,542 B1* | 10/2004 | Haartsen | 455/574 |
| 2002/0120439 A1* | 8/2002 | Mekuria et al. | 704/215 |
| 2006/0193269 A1 | 8/2006 | Perraud et al. | |

FOREIGN PATENT DOCUMENTS

| | | |
|---|---|---|
| EP | 1261176 A1 | 11/2002 |
| KR | 10-20020078915 A | 10/2002 |

* cited by examiner

*Primary Examiner* — Chi Pham
*Assistant Examiner* — Kouroush Mohebbi
(74) *Attorney, Agent, or Firm* — Alan A. R. Cooper; Wade J. Brady, III; Frederick J. Telecky, Jr.

(57) ABSTRACT

A wireless transceiver is provided for transmitting and receiving audio data, comprising: a microphone configured to generate a digital audio signal that includes the audio data, based on a received sound sampled into digital format; a voice detection circuit configured to detect the presence of voice activity in the audio data, and to generate a voice detection signal indicating whether the voice activity is present in the audio data; a transceiver circuit configured to transmit the audio data over a wireless medium; and a control circuit configured to control transmission of the audio data over the wireless medium by the transceiver circuit, based on the voice detection signal. This allows saving of transmission power since no transmission is done during the silence periods. The digital audio signal is at least one of a pulse code modulated signal without compression, and a Bluetooth signal.

15 Claims, 4 Drawing Sheets

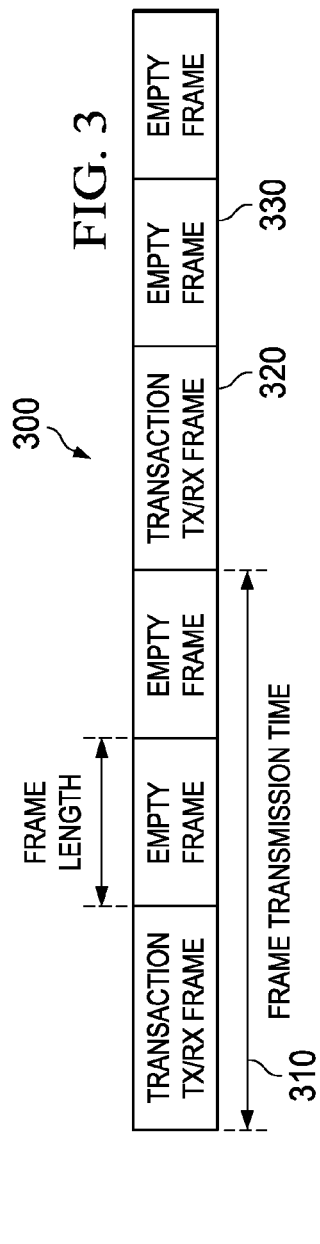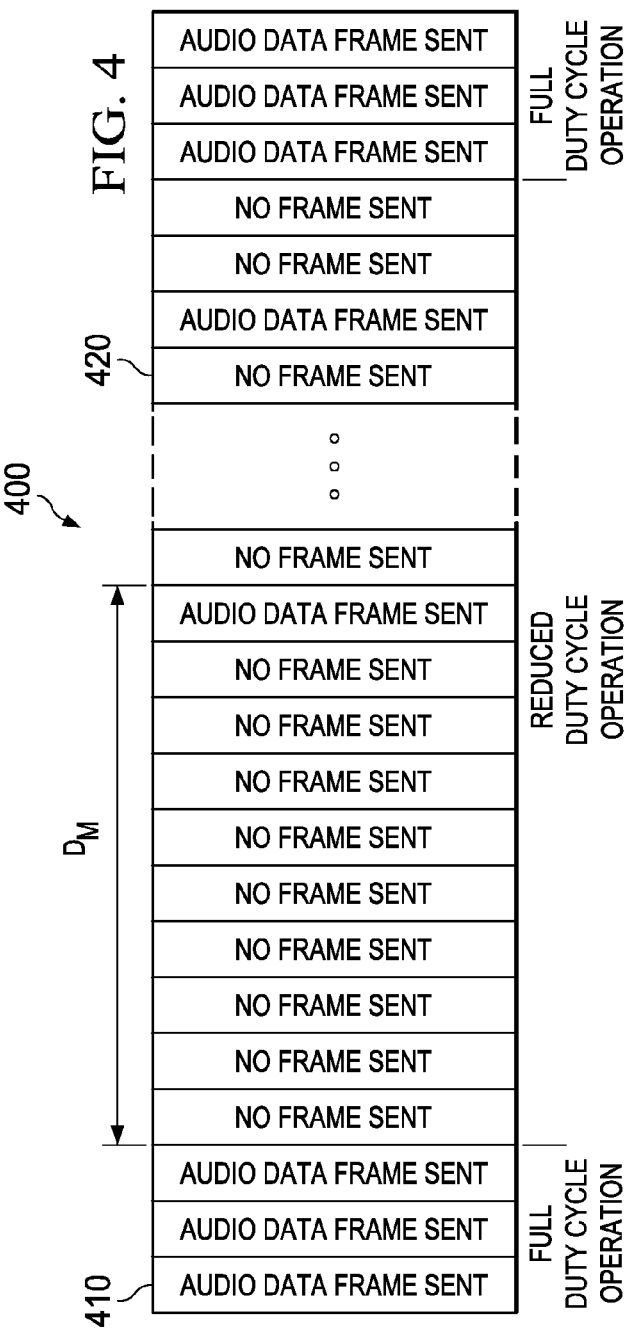

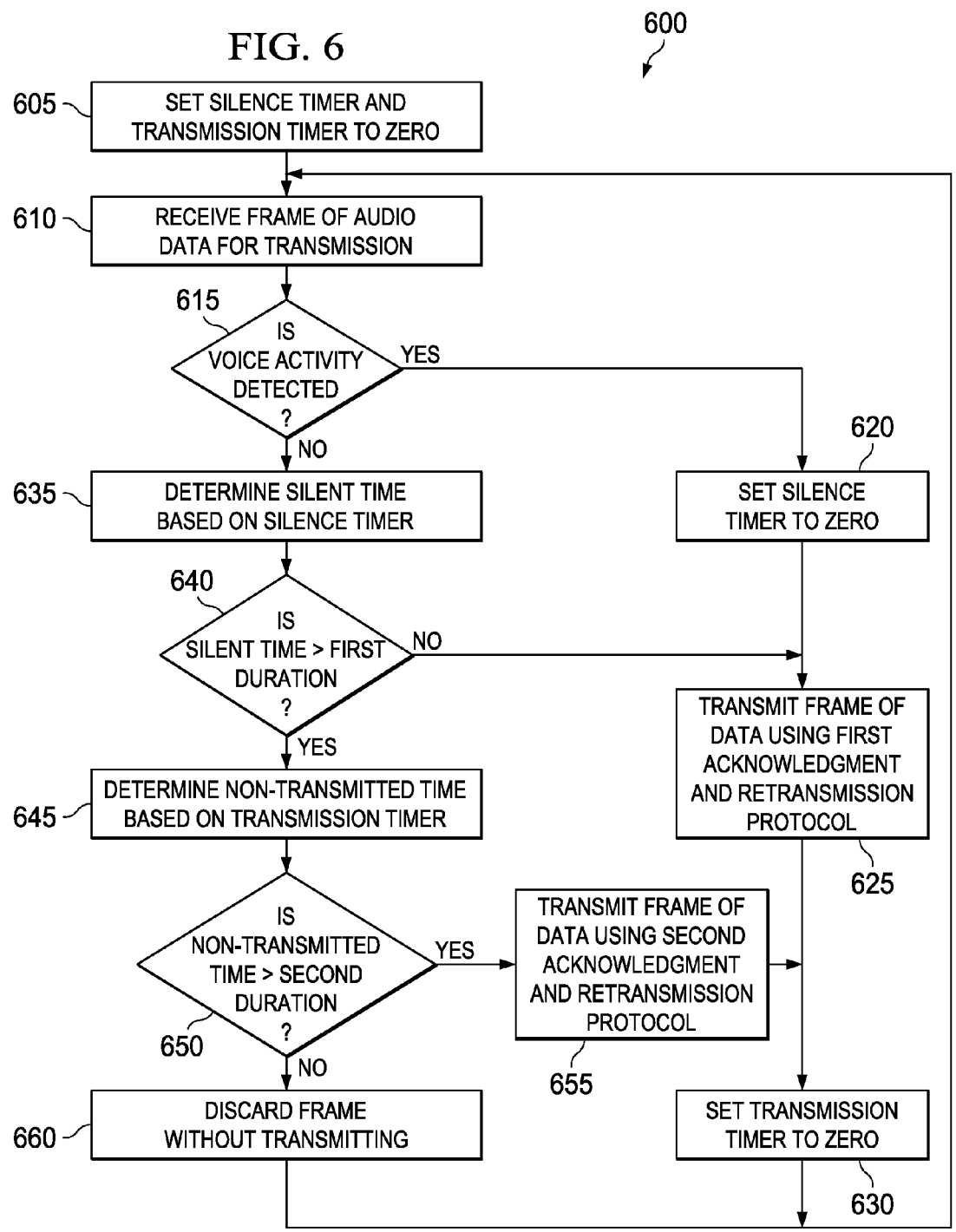

SYSTEM AND METHOD FOR REDUCING POWER CONSUMPTION IN A WIRELESS DEVICE

CROSS-REFERENCE TO RELATED APPLICATION

This application claims priority from, and incorporates herein by reference, U.S. Provisional Application No. 60/948,830 filed on Jul. 10, 2007, entitled "VOICE ACTIVITY DETECTION FOR BLUETOOTH LINKS."

TECHNICAL FIELD

The present invention relates to a system and method for reducing power consumption in wireless devices. In particular, it relates to a system and method for reducing power in a transceiver for transmitting audio data that includes voice data.

BACKGROUND

Numerous wireless devices exist for passing audio data between two locations. Many such devices are used for passing voice data, often during a conversation between one or more people. For example, mobile telephones commonly connect two speakers, while wireless headsets or earpieces connect the individual speakers wirelessly to their mobile telephones. Many such headsets or earpieces have been provided that use the Bluetooth standard.

The headset or an earpiece is designed to affix to a user's head or ear and then wirelessly communicate with the user's mobile telephone when the user is making or receiving a telephone call. Such a device is synchronized to an associated mobile telephone, and then maintains a wireless connection with that mobile telephone. This frees the user's hands from having to manipulate the telephone, making it easier and safer to engage in a telephone conversation.

The headset or earpiece receives incoming wireless signals from the mobile telephone that correspond to incoming audio data received by the telephone from a remote caller. It then converts these incoming electrical signals into sound for the user to hear. Likewise, the headset gathers sound made proximate to the headset or earpiece (e.g., the user's voice), converts this sound to outgoing electrical signals, and transmits the outgoing electrical signals to the mobile telephone. In this way, a two-way conversation can be conducted by the user through the headset or earpiece by simply having it maintain a communication link with the associated mobile telephone.

However, given that these headsets and earpieces will be affixed to a user's head or ear, it is desirable to keep them as light and compact as possible. As a result, their battery power is typically comparatively low as compared to the associated mobile telephone. It is therefore desirable to limit the power used by a headset or earpiece as much as possible.

One way to limit the power consumption of a headset or earpiece is to shut the headset or earpiece off when the associated mobile telephone is not engaged in communication with a telephone network (i.e., when there is no current telephone call being processed). The mobile telephone must remain on to properly receive or make calls. But the headset or earpiece can remain off, conserving power. Since the user must take action to make a connection (either answering an incoming call or initiating an outgoing call), he or she can at this time turn on the headset or earpiece as well.

Some communication protocols, such as the Bluetooth protocol, perform this operation automatically. This means that when there is no telephone call, there is no active connection between the phone and the headset, but just a very simple and short information exchange to allow a rapid link establishment between the phone and the headset once a phone call occurs.

But once a call has been engaged, the headset or earpiece remains on and must maintain its connection with the mobile telephone. In order to do so, the headset or earpiece typically transmits and receives audio data packets (also called audio data frames) to and from the mobile telephone as a rate sufficient to maintain an acceptable quality of service for audio communication.

However, during voice communication (e.g., a telephone call), the user of the headset is typically not speaking all of the time. On average, a user will likely be speaking approximately half the time, and listening the other half. During times when the user is not speaking (e.g., when one or more other parties to the conversation are speaking, or when no one is speaking), there is no voice data that needs to be transmitted by the headset or earpiece. But the headset or earpiece will nevertheless convert and transmit the audio data picked up by the headset or earpiece (e.g., ambient noise), and send that audio data to the mobile telephone, despite the fact that it has no voice data on it.

This requires the headset or earpiece to continually transmit audio data, even when there is no audio data to send, draining battery power for such unnecessary transmissions, which can result in a significant loss of battery life.

In a typical Bluetooth transmission, for example, 90% of power is drawn by the physical layer (PHY) and the radio frequency (RF) circuits (e.g., 40 mA power consumption for RF and PHY, compared to 4 mA for base-band and media access controller). Assuming that in a typical conversation 50% of the data packets are silent (i.e., a user is listening, rather than talking), that means that approximately 45% the power is drained by the PHY and RF circuits. Taking into account that half to the PHY and MAC operations are transmitting and half are receiving, this means that during a silent period (i.e., when there is no voice activity in the transmitted audio data), 22.5% of the power loss is wasted sending unneeded audio data packets.

It would therefore be desirable to provide a way to limit the transmission of audio data from a remote device to a base device over a voice communication link when the remote device does not have any voice data to transmit.

SUMMARY

Accordingly, a wireless transceiver is provided for transmitting and receiving audio data, comprising: a microphone configured to generate a digital audio signal that includes the audio data, based on a received sound sampled into digital format; a voice detection circuit configured to detect the presence of voice activity in the audio data, and to generate a voice detection signal indicating whether the voice activity is present in the audio data; a transceiver circuit configured to transmit the audio data over a wireless medium; and a control circuit configured to control transmission of the audio data over the wireless medium by the transceiver circuit, based on the voice detection signal, wherein the digital audio signal is at least one of a pulse code modulated signal without compression, and a Bluetooth signal.

The control circuit may be configured to control the transceiver circuit to transmit the audio data at a first duty cycle when the voice detection signal indicates the voice activity is present in the received audio, and the control circuit may also be configured to control the transceiver circuit to transmit null data at a second duty cycle when the voice detection signal indicates the voice activity is not present in the received audio.

The wireless transceiver may further comprise a timer circuit configured to measure a duration when the voice detection signal indicates that the voice activity is not present in the audio data.

The control circuit may be configured to control the transceiver circuit to transmit the audio data at a first duty cycle when the voice detection signal indicates the voice activity is present in the received sound, and the control circuit may also be configured to control the transceiver circuit to transmit null data at a second duty cycle when the timer circuit indicates that voice detection signal has indicated that the voice activity is not present in the audio data for at least a delay period.

The null signal in each of these cases may be equal to a fractional portion of the silence period in the audio data.

A method is also provided for wireless transmission of audio data, comprising: receiving the audio data; detecting whether voice activity has been present in the audio data over a measurement duration; transmitting frames of the audio data at a first frame duty cycle when the voice activity is detected in the audio data over a measurement duration; and transmitting the frames of null data at a second frame duty cycle when voice activity is not detected in the audio data over a measurement duration, wherein the first frame duty cycle is greater than the second frame duty cycle.

The first frame duty cycle may be between 90% and 100%; and the second frame duty cycle may be between 5% and 20%. The second frame duty cycle may provide for transmission of one of the frames of null data at least once every 100 milliseconds. The null data may be equal to a fractional portion of the audio data. The measurement duration may be between 3 and 50 milliseconds.

The detecting of whether the voice activity has been present may further comprise performing a continuous voice detection operation over a window of the measurement duration using a detection resolution smaller than the measurement duration.

A device for wireless transmission of audio data is provided, comprising: means for receiving the audio data; means for detecting whether voice activity has been present in the audio data over a measurement duration; means for transmitting frames of the audio data at a first frame duty cycle when the voice activity is detected in the audio data over a measurement duration; and means for transmitting the frames of null data at a second frame duty cycle when voice activity is not detected in the audio data over a measurement duration, wherein the first frame duty cycle is greater than the second frame duty cycle.

The first frame duty cycle may be between 90% and 100%; and the second frame duty cycle may be between 5% and 20%. The second frame duty cycle may provide for transmission of one of the frames of null data at least once every 100 milliseconds. The null data may be equal to a fractional portion of the audio data. The measurement duration may be between 3 and 50 milliseconds.

The device for wireless transmission of the audio data may further comprise means for disabling a retransmission operation when voice activity is not detected in the audio data over a measurement duration.

The means for detecting may perform a continuous voice detection operation over a window of the measurement duration using a detection resolution smaller than the measurement duration.

A method for wireless transmission of audio data is provided, comprising: receiving a frame of the audio data; determining whether voice activity has been present in the audio data over a first measurement duration; determining whether a silent duration, during which no data has been transmitted, is greater than a second measurement duration, if the voice activity is determined not to be present in the audio data over the first measurement duration; transmitting the frame of the audio data received using a first frame acknowledgement and retransmission protocol if the voice activity has been determined to be present in the audio data over the first measurement duration; transmitting a null data frame using a second frame acknowledgement and retransmission protocol if the voice activity has been determined to not be present in the audio data over the first measurement duration, and the silent duration is determined to be greater than the second measurement duration; and disabling data frame transmission and retransmission if the voice activity has been determined to not be present in the audio data over the first measurement duration, and the silent duration is determined to not be greater than the second measurement duration.

The first measurement duration may be between 3 and 50 milliseconds; and the second measurement duration may be less than 100 milliseconds.

The null data frame may be the received frame of the audio data. The first frame acknowledgement and retransmission protocol may require acknowledgement and may allows retransmission of the received data frame.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 3 is a diagram showing a frame structure of a Bluetooth connection according to disclosed embodiments;

FIG. 4 is a diagram showing a frame transmission scheme between a remote device and a base device based on differing duty cycles according to disclosed embodiments;

FIG. 6 is a flow chart describing a frame transmission process according to disclosed embodiments.

DETAILED DESCRIPTION

Figure 1:
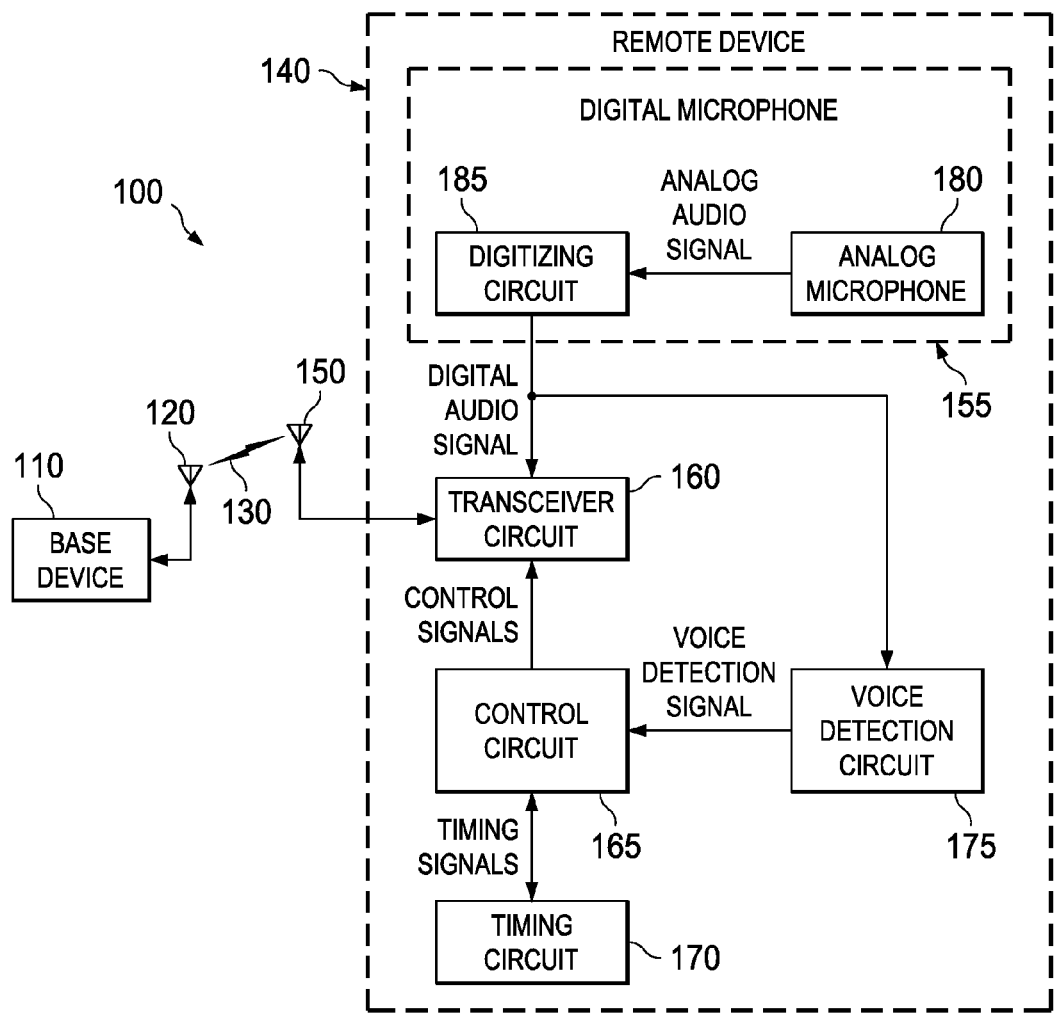
FIG. 1 is a block diagram showing a system including a base device and remote device communicating over a wireless link according to disclosed embodiments.

In overview, the present disclosure concerns the adjustment of duty cycle in a wireless device based on the detection of voice activity in audio data being transmitted, in order to reduce power usage when no voice activity is present.

This objective of reducing power usage when there is no voice data to transfer is accomplished by detecting the presence or absence of voice data, and then reducing the duty cycle of the transmitted audio data when no voice data is present to a level that will eliminate many unnecessary transmissions, but will nevertheless maintain a communication link.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order, i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs, along with a variety of memory types. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation, and would be aware of the many types of available computer memory. Therefore, in the interest of brevity and minimization of any risk of obscuring principles and concepts, further discussion of such software, ICs, and memory elements, if any, will be limited to the essentials with respect to the principles and concepts used by the exemplary embodiments.

As further discussed herein below, various inventive principles and combinations thereof are advantageously employed to reduce increase the amount of cross-regulation among power outputs of a switched-mode power converter, thereby reducing the maximum power drift across the power outputs.

Wireless Voice Connection Between a Base Device and a Remote Device

FIG. 1 is a block diagram showing a system 100 including a base device 110 and remote device 140 communicating over a wireless link 130 according to disclosed embodiments.

As shown in FIG. 1, the system 100 includes a base device 110 with a base antenna 120 that communicates over a wireless link 130 with a remote device 140 having a remote antenna 150. The remote device further includes a digital microphone 155, a transceiver circuit 160, a control circuit 165, a timer circuit 170, and a voice detection circuit 175. The digital microphone further includes an analog microphone 180 and a digitizing circuit 185.

The base device 110 is a communications device that maintains a wireless link 130 with the remote device 140. The base antenna 120 and the remote antenna 150 are appropriate antennas for maintaining the wireless link 130.

In many embodiments the base device 110 will be a mobile telephone 110, the remote device 140 will be a headset or earpiece, the wireless link 130 will be a Bluetooth link, and the base antenna 120 and the remote antenna 150 will be antennas appropriate for a Bluetooth connection. However, the nature of the base device 110, the base antenna 120, the remote device 140, the remote antenna, and the link 130 between the base device 110 and the remote device 140 can vary in alternate embodiments. The base device 110 and the remote device 140 can be any two devices that transfer audio data between each other, and the wireless link 130 can be any sort of desired link suitable for transferring the audio data. In one set of embodiments, the base device 110 can be a telephone handset while the remote device 140 can be a headset or earpiece.

The digital microphone operates to provide a digital audio signal to the transceiver circuit 160 and the voice detection circuit 175. In the disclosed embodiment, the analog microphone 180 receives an incoming sound and generates an analog audio signal corresponding to the incoming sound. The digitizing circuit 185 then receives the analog audio signal and converts it to the digital audio signal. In the disclosed embodiment this is done using a digitizing operation without the use of any encoding.

The transceiver circuit 160 operates to transmit and receive wireless signals to the base device 110 via the remote antenna 150. In particular, it receives the digital audio signals from the digital microphone 155 and can transmit those audio signals to the base device 110. The operation of the transceiver circuit 160 is controlled by control signals received from the control circuit 165.

In implementation, the transceiver circuit 160 can be any known transceiver circuit. In one particular embodiment, the transceiver circuit 160 is a Bluetooth transceiver. Such transceivers are well known in the art. However, in alternate embodiments other transceiver types can be used.

The control circuit 165 sends and receives timing signals to and from the timer circuit 170, and receives a voice detection signal from the voice detection circuit 175. It generates control signals to control operation of the transceiver circuit 160, in part based on the timing signals and the voice detection signal.

The timer circuit 170 can be used to generate one or more timing signals that indicate elapsed periods of time. In particular, the timer circuit 170 can be configured to measure a time that the voice detection signal indicates no voice activity, and a time since the last frame transmission to the base device 110. Its operation is controlled by timing signals received from the control circuit 160.

The voice detection circuit 175 receives the digital audio signal from the digital microphone 155 and determines whether there is voice activity in the digital audio data. It then provides the voice detection signal to the control circuit 160, indicating whether it has detected voice activity in the digital audio data or not.

The voice detection circuit 175 operates to analyze the spectrum of the sound in the digital audio signal to determine whether a voice is present. This process and the associated circuit for doing would be well-known by someone of ordinary skill in the art.

In some embodiments the voice detection circuit 175 can operate by analyzing successive blocks of time (e.g., 20 millisecond blocks) to search for voice activity. In other embodiments the voice detection circuit 175 can maintain a running estimation of the presence of voice activity for a running block of digital audio data (e.g., the last 20 milliseconds). The precise duration of the analyzed block of time (whether a discrete time or running time), can vary in different embodiments. But it cannot be lower than the size of a single frame of audio data, since that is the limit of resolution for the audio data.

Duty Cycle Transitioning

Figure 2:
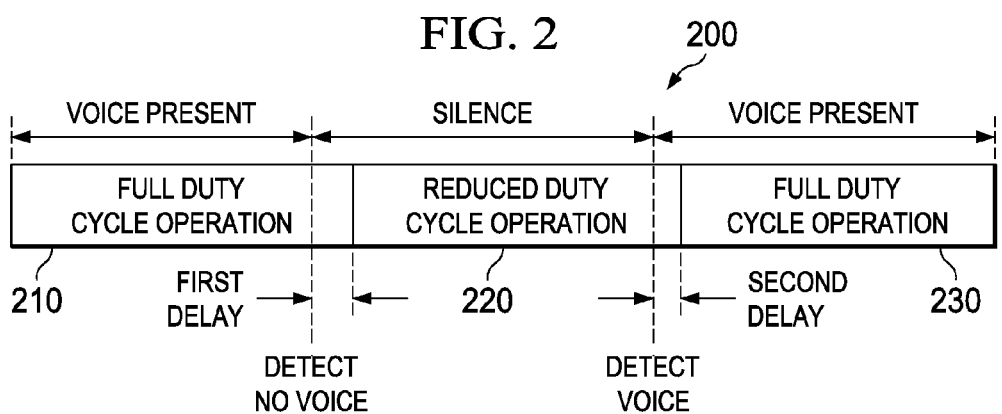
FIG. 2 is diagram showing the duty cycle operation of a transceiver based on voice detection according to disclosed embodiments.

FIG. 2 is diagram showing the duty cycle operation 200 of a transceiver based on voice detection according to disclosed embodiments. As shown in FIG. 2, operation can be performed using a full duty cycle 210, 230 or using a reduced duty cycle 220, based on whether the associated device detects voice activity or does not detect voice activity in the audio data for transmission.

In particular, when voice activity is present in the audio data for transmission, the transceiver will operate at a full duty cycle. Typically this is a 100% duty cycle, in which a data packet is transmitted by the transceiver in every frame (or slot) provided by the connection scheme for the transmission of data from the transceiver, since that maximizes the signal quality of the connection. However, it is possible that some alternate embodiments could use a full duty cycle of less than 100% for reasons of power savings or the like. In such a case a lower duty cycle (e.g., 90% or 95% could be used as a full duty cycle).

As the transceiver transmits audio data, it monitors the audio data for voice activity. When it detects no voice activity in the audio data, the transceiver transitions into a reduced duty cycle operation for the duration of the silence. During this reduced duty cycle operation, the transceiver will transmit during fewer slots than it would during a full duty cycle operation. For example, in some embodiments it may transmit during one out of every twenty frames (or slots) assigned for transmission (i.e., at a 5% duty cycle); in other embodiments it may transmit during one out of every five frames (or slots) assigned for transmission (i.e., a 20% duty cycle). The precise duty cycle chosen may vary in different embodiments. In some Bluetooth environments, a 10% reduced duty cycle may be desirable, in which case the transceiver only transmits one out of every ten audio data packets generated during a silent period.

Regardless, the reduced duty cycle should be chosen to be sufficiently high that a communication link between the remote device and the base device will be maintained. This may be necessary in situations in which the base device is programmed with a timeout duration $D_{TO}$ that is used to determine when to break communications with a remote device. Such a timeout duration $D_{TO}$ may be used by the base device as an indicator that either the remote device has dropped the communication link from its end, or that the communication link has degraded to the point that it cannot be maintained. Such timeout durations $D_{TO}$ are typically provided to allow a user a chance to reconnect when a connection is lost.

In embodiments in which the base device has a timeout duration $D_{TO}$, the base device will end a communication link with the remote device if it does not receive a data frame (or packet) from the remote device at least once every timeout duration $D_{TO}$. In Bluetooth devices, for example, the timeout duration $D_{TO}$ is often set to be around 100 milliseconds, which is around the threshold for human tolerance for noticing sound.

Thus, in an embodiment in which the base device has a timeout duration $D_{TO}$, the reduced duty cycle must be chosen to be sufficiently high that the remote device will transmit at least one data frame (or data packet) during each timeout duration $D_{TO}$. Otherwise, the base device may break off the communication link during the silent period, assuming that the communication link was lost.

In addition, there will be some minimum delay between moving from the full duty cycle operation 210 to the reduced duty cycle operation 220 (a first delay). At a minimum, this first delay will represent the time it takes to monitor voice activity in the data for transmission, determine that there is no longer any voice activity in the data, and switch the duty cycle of the transceiver. However, the remote device can also make this time longer in some embodiments. For example, the remote device could set a minimum threshold for silence before the duty cycle will change in order to eliminate its application to very small silent periods. In one exemplary embodiment this threshold time is 50 milliseconds. However this can vary as desired in alternate embodiments, down to the minimum possible delay.

As the transceiver proceeds in the reduced duty cycle operation 220, it will continue to gather audio data as it would during full duty cycle operation 210, although it will only transmit the audio data according to the reduced duty cycle. The transceiver will also continue to monitor the gathered audio data for voice activity. And when it detects voice activity (i.e., the presence of voice activity in the audio data), it will return to a full duty cycle operation 230 and begin to transmit audio data packets at a full duty cycle.

As with the switch from the full duty cycle operation 210 to the reduced duty cycle operation 220, there will be some minimum delay between moving from the reduced duty cycle operation 220 to the full duty cycle operation 230 (a second delay). The minimum value of this second delay will be the time it takes to monitor voice activity, determine that there is now voice activity, and switch the duty cycle of the transceiver. The device may make this time longer in some embodiments. But since there are typically quality of service issues with voice transmission, most embodiments will make this transition back to full duty cycle as quickly as possible.

Also, although the period of no voice activity is referred to as a silent period, it does not have to be truly silent. Rather, it refers to a period when there is no voice activity. Thus, there may be some sound present, such as background noise or the like. But during the silent period there is no sound that a voice detection circuit would consider voice activity.

In addition, a default operation mode can vary in alternate embodiments. In some embodiments the default for a device can be a full duty cycle operation, which is changed to a reduced duty cycle operation when the device detects that there is no voice activity. In other embodiments, the default for a device can be a reduced duty cycle operation, which is changed to a full duty cycle operation when voice activity is detected.

Reduced Duty Cycle in a Bluetooth Environment

One of the most commonly used wireless connection protocols for transmitting voice data is the Bluetooth protocol. Many wireless headsets and earpieces are designed to connect to mobile telephones using the Bluetooth protocol. And while the disclosed systems and methods should not be limited to use in a Bluetooth environment, it does provide a useful example of how the systems and methods may be applied to one particular protocol.

FIG. 3 is a diagram 400 showing a frame structure of a Bluetooth connection according to disclosed embodiments. As shown in FIG. 3, Bluetooth environments divide the available transmission time into a number of consecutive frame transmission times 310, each containing one or more individual frames 320, 330. The particular environment of FIG. 3 shows that the frame transmission time 310 is divided into three separate frames, a transaction Tx/Rx frame 320 and two empty frames 330.

The transaction Tx/Rx frame 320 is provided for the transceiver to transmit and receive data. The two empty frames 320 are provided to allow time for retransmission of data that was not successfully transmitted during the transaction Tx/Rx frame 320 (e.g., as determined based on whether an acknowledgement of the transmission was received of not). For example, Bluetooth version 1.2 allows for one re-transmission opportunity. Other Bluetooth versions may allow different numbers of retry attempts. And in some versions, the number of retry attempts may be changeable.

In one exemplary Bluetooth environment, the length of each individual frame 320, 330 is 1.25 milliseconds, making the length the frame transmission time 3.75 milliseconds. Assuming that a base device has a 100 millisecond timeout duration $D_{TO}$, this means that the number of frame transmission times 310 in the timeout duration is equal to:

$$\frac{100 \, \text{m sec}}{3.75 \, \text{m sec/frame}} = 26.7 \text{ frames} \approx 25 \text{ frames} \quad (1)$$

Thus, for this exemplary Bluetooth transmission scheme, the lowest that the reduced duty cycle could possibly go and still transmit at least one frame during the timeout duration $D_{TO}$ (i.e., and maintain the connection between the remote device and the base device) is about 4%. And an embodiment that desired a margin for error might well choose a higher reduced duty cycle than that.

FIG. 4 is a diagram showing a frame transmission scheme between a remote device and a base device based on differing duty cycles according to disclosed embodiments. As shown in FIG. 4, the full duty in this embodiment is 100% and the reduced duty cycle is 10%. In other words, during the full duty cycle the remote device transmits during all of the frame transmission times assigned to it, while in the reduced duty cycle the remote device only transmits during one out of every ten frame transmission times assigned to it.

FIG. 4 shows that each frame transmission time is either a first frame transmission time 410 during which a frame of audio data is sent, or is a second frame transmission time 420 during which no audio data frame is sent.

During the full duty cycle operation, every frame transmission time is a first frame transmission time 410. In other words, during full duty cycle operation, a frame of audio data is sent during every transaction Tx/Rx frame 320 (i.e., at every opportunity to transmit).

In contrast, during the reduced duty cycle operation, only one out of every ten frame transmission times is a first frame transmission time 410. The other nine frame transmission times are second frame transmission time 420. In other words, during reduced duty cycle operation, a frame of audio data is only transmitted in one transaction Tx/Rx frame out of ten. The other audio data frames are discarded without being transmitted.

As a result of this, the maximum duration $D_M$ between audio frames being transmitted in this embodiment will be equal to ten times the length of the frame transmission time (i.e., 37.5 milliseconds where the exemplary Bluetooth embodiment of FIG. 3 is used). And so long as the maximum duration $D_M$ is kept below the timeout duration $D_{TO}$ (i.e., $D_M < D_{TO}$), the communication link between the remote device and the base device will not be dropped.

Also as shown in FIG. 4, when the remote device transitions from reduced duty cycle operation to full duty cycle operation, it is not necessary to wait until an entire maximum duration $D_M$ passes since the last first frame transmission time (i.e., since an audio data frame was last transmitted). The transition to full duty cycle operation may take place as soon as possible to maintain the best possible quality of service.

For example, in FIG. 4, only two second frame transmission times 420 occur after the most recent first frame transmission time 410 before a full duty cycle operation resumes. The transition to full duty cycle operation in this embodiment is controlled based on a voice detection operation, regardless of when the last audio data frame transmission was made. This is because the transmission of audio data frames during the reduced duty cycle operation is performed only to maintain a communication link. Once full duty cycle operation is to begin again, this should no longer be a concern, since data frames will now be transmitted at the full duty cycle.

In addition, although FIGS. 3 and 4 refer to a frame transmission time 310, 410, 420 and individual frames 320, 330, it is also possible to simply refer to the frame transmission time 310, 410, 420 as a frame and the individual frames 320, 330 in the frame transmission time 310 as slots.

Methods of Transitioning Duty Cycle

Figure 5:
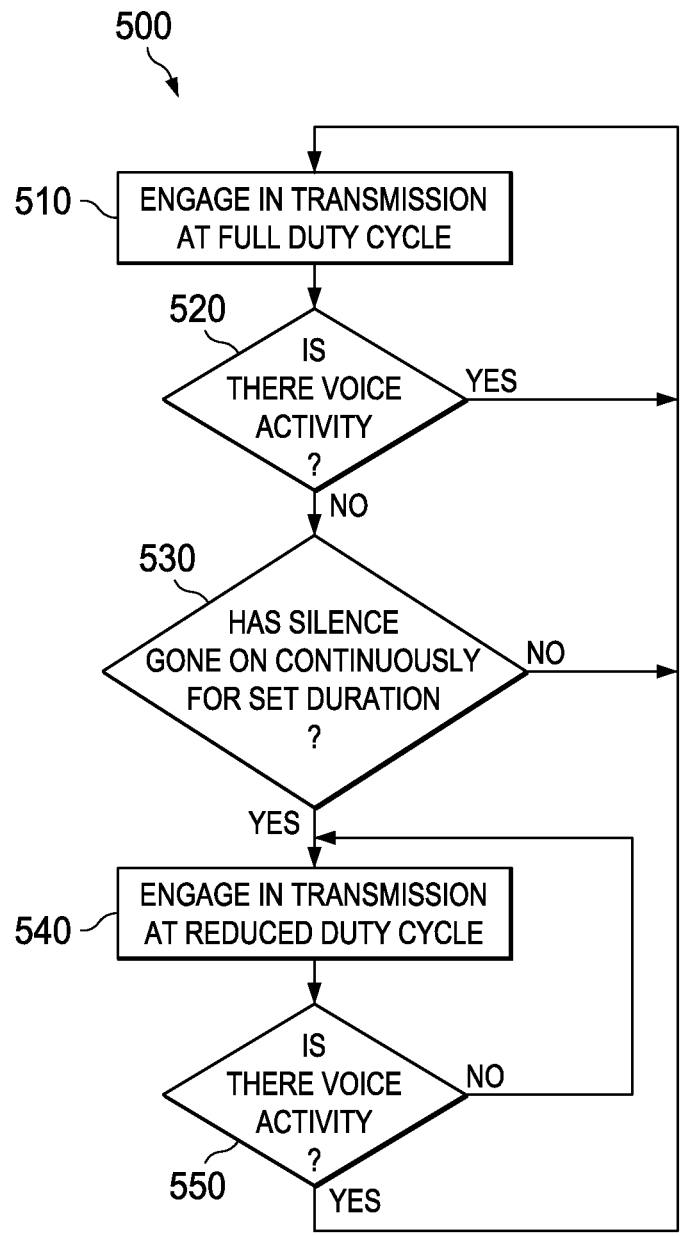
FIG. 5 is a flow chart describing a process of reducing duty cycle based on voice detection in a wireless device according to disclosed embodiments.

Exemplary methods of transitioning duty cycle can be considered from a high level, in which the general operation of a remote device is described, or from a lower level in which the more specific processing of individual frames is described. FIG. 5 shows an exemplary high-level method, and FIG. 6 shows an exemplary lower level method.

FIG. 5 is a flow chart describing a process of reducing duty cycle based on voice detection in a wireless device according to disclosed embodiments.

As shown in FIG. 5, processing begins with a device engaging in transmissions at a full duty cycle (510). The device then determines whether there is voice activity present in the data being received for transmission (520).

If there is voice activity detected, then the device continues to engage in transmissions using the full duty cycle (510). If, however, there is no activity detected, the device then determines whether the silence has gone on for a set duration (530). This duration can be a minimum time required for detection in some embodiments, or it can be a longer period of time in other embodiments.

If the silence has not gone on for the set duration, then the device continues to engage in transmissions using the full duty cycle (510). If, however, the silence has gone on for the set duration, then the device then engages in transmission at a reduced duty cycle (540). This reduced duty cycle should be chosen such that frames of audio data are transmitted at least frequently enough to maintain the communication link between the device and whatever other device it is communicating with.

This reduced duty cycle operation may be performed using the same retransmission and acknowledgement protocol as for the full duty cycle, or may be performed using a different acknowledgement protocol. In some embodiments retransmissions may be disabled during the reduced duty cycle operation, since the audio data being sent does not contain voice data, and so is not as vital to get through to its destination. In other embodiments (e.g., if there is little margin for error in maintaining the wireless communication link), retransmissions may be enabled to maximize the chance that at least one data frame will be successfully passed during each timeout duration $D_{TO}$.

Once the device begins engaging in transmission at a reduced duty cycle (540). The device continues to determine whether there is voice activity present in the data being received for transmission (550).

If there is no voice activity detected in the data received for transmission, then the device will continue to engage in transmission at the reduced duty cycle (540). If, however, there is voice activity detected in the data detected for transmission, then the device will switch back to engaging in transmission at the full duty cycle (510).

This exemplary embodiment can be implemented using Bluetooth transmissions, or those of any appropriate transmission scheme.

Although the process of FIG. 5 shows that the method begins by operating at the full duty cycle (510), alternate embodiments could just as easily start with operations at the reduced duty cycle (550).

FIG. 6 is a flow chart describing a frame transmission process according to disclosed embodiments. This process is performed by a device that receives frames of audio data for transmission over a wireless medium.

As shown in FIG. 6, the process begins by setting a silence timer and a transmission timer to zero (605). Although FIG. 6 does not show these timers being incremented, it should be clear from the description of FIG. 6 that they are constantly running as all of the other operations of FIG. 6 are being performed, and are only reset to zero when noted.

After both timers are zeroed out, the device starts by receiving a frame of audio data for transmission (610), which is then analyzed to determine whether it contains voice activity (615). This analysis of the audio data frame can be achieved by a known voice activity detection method, as would be understood by one of ordinary skill in the art. The presence of voice activity may determined based on the current frame alone, or it may be determined based on a set of several frames including the current frame.

If voice activity is detected, then the device sets the silence timer to zero (620) and transmits the frame of data using a first acknowledgement and retransmission protocol (625). Often this will be a protocol that uses acknowledgement and allows for retransmission, since it is desirable to keep the link quality high for voice communication.

Following transmission of the data frame, the device will set the transmission timer to zero (630), and will again receive a frame of audio data for transmission (610).

If no voice activity is detected (615), however, then the device will determine a silence time based on the silence timer (635). This silence time indicates the length of time that voice activity has not been detected in the received frames of audio data.

Once the silence time is determined, the device will then compare the silence time with a first duration (640). This first duration represents a threshold time for when a reduced duty cycle should be used. As a result, if the silence time is not greater than the first duration, the device will transmit the frame of data using the first acknowledgement and retransmission protocol (625).

If, however, the silent time is greater than the first duration, the device will then determine a non-transmitted time based on the transmission timer (645). This non-transmitted time indicates the length of time since a data frame was last transmitted.

Once the non-transmitted time is determined, the device will then compare the non-transmitted time with a second duration (650). This second duration represents a maximum time allowed between data frame transmissions. This second duration should be set to be less than the timeout duration $D_{TO}$ for the current wireless connection.

If the non-transmitted time is greater than the second duration, this indicates that it is necessary to transmit a data frame to maintain the wireless link, even though there is still no voice data in the audio data frame. As a result, the device will transmit the frame of data, though it will use a second acknowledgement and retransmission protocol (655). In some embodiments the second acknowledgement and retransmission protocol will be the same as the first acknowledgement and retransmission protocol. In others embodiments it be different, for example, disabling acknowledgement and retransmission.

If, however, the non-transmitted time is not greater than the second duration (650), then the wireless link is not in danger of being suspended or disconnected, and the device can safely discard the data frame without transmitting it (660). In such a case, the transmission circuits for the device will draw no power, and the battery life for the device will be extended.

Following the discarding of the frame, the device receives another frame of audio data for transmission (610), and the process repeats. It should be noted, however, that by following this last path, and discarding the audio data frame, neither the silence timer nor the transmission timer are reset. Both continue to run in this case, allowing the silence time and non-transmission time to increase.

CONCLUSION

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed:

1. A method for wireless transmission of audio data, comprising:
   receiving the audio data;
   detecting whether voice activity has been present in the audio data over a set measurement duration;
   transmitting frames of the audio data packets at a first frame duty cycle when the voice activity is detected in the audio data over a first set measurement duration;
   transmitting the frames of null data packets at a second frame duty cycle when voice activity is not detected in the audio data over a second set measurement duration,
   wherein the first frame duty cycle is greater than the second frame duty cycle, and
   wherein the first set measurement duration and the second set measurement duration are measured over two, at least somewhat overlapping, durations of their respective elapsed time increments.

2. The method of claim 1, wherein the first frame duty cycle is between 90% and 100%.

3. The method of claim 1, wherein the second frame duty cycle is between 5% and 20%.

4. The method of claim 1, wherein the second frame duty cycle provides for transmission of one of the frames of null data at least once every 100 milliseconds.

5. The method of claim 1, wherein the null data is equal to a fractional portion of the audio data.

6. The method of claim 1, wherein the measurement duration is between 3 and 50 milliseconds.

7. The method of claim 1, wherein the detecting whether the voice activity has been present further comprises performing a continuous voice detection operation over a window of the measurement duration using a detection resolution smaller than the measurement duration.

8. A device for wireless transmission of audio data, comprising:
- means for receiving the audio data;
- means for detecting whether voice activity has been present in the audio data over a first set measurement duration;
- means for transmitting frames of the audio data packets at a first frame duty cycle when the voice activity is detected in the audio data over the first set measurement duration; and
- means for transmitting the frames of null data packets at a second frame duty cycle when voice activity is not detected in the audio data over a second set measurement duration,
- wherein the first frame duty cycle is greater than the second frame duty cycle, and
- wherein the first set measurement duration and the second set measurement durations are measured over two, at least somewhat overlapping durations of their respective elapsed time increments.

9. The device for wireless transmission of the audio data, as recited in claim 8, wherein the first frame duty cycle is between 90% and 100%.

10. The device for wireless transmission of the audio data, as recited in claim 8, wherein the second frame duty cycle is between 5% and 20%.

11. The device for wireless transmission of the audio data, as recited in claim 8, wherein the second frame duty cycle provides for transmission of one of the frames of null data at least once every 100 milliseconds.

12. The device for wireless transmission of the audio data, as recited in claim 8, wherein the null signal is equal to a fractional portion of the audio signal.

13. The device for wireless transmission of the audio data, as recited in claim 8, further comprising means for disabling a retransmission operation when voice activity is not detected in the audio data over a measurement duration.

14. The device for wireless transmission of the audio data, as recited in claim 8, wherein the measurement duration is between 3 and 50 milliseconds.

15. The device for wireless transmission of the audio data, as recited in claim 8, wherein the means for detecting performs a continuous voice detection operation over a window of the measurement duration using a detection resolution smaller than the measurement duration.

* * * * *